United States Patent [19]

Yano

[11] Patent Number: 4,777,592
[45] Date of Patent: Oct. 11, 1988

[54] INFORMATION PROCESSING SYSTEM COMPRISING A REGISTER RENEWAL WAITING CONTROL CIRCUIT WITH RENEWAL REGISTER NUMBER REGISTERING MEANS

[75] Inventor: Haruo Yano, Tokyo, Japan

[73] Assignee: NEC Corporation, Tokyo, Japan

[21] Appl. No.: 874,678

[22] Filed: Jun. 16, 1986

[30] Foreign Application Priority Data

Jun. 17, 1985 [JP] Japan .............................. 60-131154
Jun. 17, 1985 [JP] Japan .............................. 60-131156

[51] Int. Cl.$^4$ .......................... G06F 9/00; G06F 9/32; G06F 9/36; G06F 9/38
[52] U.S. Cl. ..................................... 364/200; 364/736
[58] Field of Search ... 364/200 MS File, 900 MS File, 364/736

[56] References Cited

U.S. PATENT DOCUMENTS

| | | | |
|---|---|---|---|
| 4,128,880 | 12/1978 | Cray, Jr. ............................ | 364/200 |
| 4,295,193 | 10/1981 | Pomerene ............................ | 364/200 |
| 4,507,728 | 3/1985 | Sakamoto et al. ..................... | 364/200 |
| 4,617,625 | 10/1986 | Nagashima et al. .................. | 364/200 |
| 4,626,989 | 12/1986 | Torii ..................................... | 364/200 |
| 4,636,942 | 1/1987 | Chen et al. .......................... | 364/200 |
| 4,661,900 | 4/1987 | Chen et al. .......................... | 364/200 |
| 4,677,544 | 6/1987 | Kinoshita ............................ | 364/200 |
| 4,683,547 | 7/1987 | DeGroot ............................. | 364/748 |

*Primary Examiner*—Archie E. Williams, Jr.
*Assistant Examiner*—Robert B. Harrell
*Attorney, Agent, or Firm*—Foley & Lardner, Schwartz, Jeffery, Schwaab, Mack, Blumenthal & Evans

[57] ABSTRACT

When one of general registers has a register number indicated by a renewal instruction and should be renewed to a result of execution by an arithmetic unit of an execution time measured in terms of machine cycles for the renewal instruction, a register (91) holds the register number as a held number. From a machine cycle number representative of the execution time, a counter (95) is counted down in each machine cycle to successively provide decreasing numbers. Coincidence circuits (97, 98) find coincidence between the held number and two register numbers indicated by a current instruction which is preceded by the renewal instruction and for which two operands should be read from the general registers of the two register numbers. When the coincidence is found, execution of the current instruction is suspended. Otherwise, the operands are read. The suspension is released when the counter is counted down to zero.

6 Claims, 11 Drawing Sheets

INFORMATION PROCESSING SYSTEM COMPRISING A REGISTER RENEWAL WAITING CONTROL CIRCUIT WITH RENEWAL REGISTER NUMBER REGISTERING MEANS

BACKGROUND OF THE INVENTION

This invention relates to an information processing system and, in particular, to an information processing system including an instruction processing unit which is operable under pipeline control.

An information processing system usually includes an instruction processing unit. Among others, the instruction processing unit processes, as a current instruction, each of program instructions which are fetched successively from a memory device. The instruction processing unit thereby produces a start signal. The information processing system further comprises a bank of general registers assigned with register numbers, respectively. One of the register numbers is indicated by the current instruction as an indicated number. The instruction processing unit reads an operand from the general register of the indicated number.

The program instructions include renewal instructions for renewing the general registers of the register numbers indicated by the respective renewal instruction. The current instruction will be called a current renewal instruction when the program instruction is a renewal instruction. The general register will be called a renewal register when the general register is to be renewed by the current renewal instruction. Moreover, the general registers will be called operand registers when operands should be read from the general registers by successive instructions which follows the current renewal instruction.

When the register number of the renewal register is equal to one of the register numbers of the operand registers, it is necessary for processing of the successive instructions by the instruction processing unit to wait renewal completion of the renewal register. Therefore, the instruction processing unit includes a register renewal waiting control circuit in order to wait complete processing of the renewal instruction for processing start of the successive instruction.

Such a register renewal waiting control circuit is disclosed in the specification of U.S. Pat. No. 4,128,880 issued to Seymour R. Cray, Jr. According to Cray, Jr., the register renewal waiting control circuit comprises reservation sections each corresponding to one of the registers. The reservation section stores information as to whether or not the corresponding register is currently involved in an executing process for the current renewal instruction. In processing one of the successive instructions, the register renewal waiting control circuit reads one of the reservation sections that is corresponding to at least one operand register indicated by the successive instruction and judges whether or not the operand register is available for production of an operand. When the operand register is not available, the register renewal waiting control circuit interrupts or suspends further processing of the successive instruction. When the operand register is available, the register renewal waiting control circuit either continues processing of the successive instruction without the interruption or restarts the previously suspended processing of the successive instruction. The conventional register renewal waiting control circuit needs the reservation sections for all the registers and also requires any circuits for detecting whether or not the registers are involved in the current renewal processing. Therefore, the conventional register renewal waiting control circuit is disadvantageous in that an increased number of circuit elements are necessary, which makes the instruction processing unit in a large scale.

The information processing system further comprises a plurality of execution devices. The program instructions may be operation instructions. The current renewal instruction and the successive instruction will be called a current operation instruction and a successive operation instruction, respectively, when the program instruction is an operation instruction. Each current operation instruction indicates one of the executing devices as an indicated device. Responsive to the start signal, the indicated device carries out operation on the operands read from the operand registers and produces a result of execution.

Even when the result of execution is equal to one of the operands which should be read from the operand registers indicated by the successive operation instruction, the operands are read from such operand registers in a conventional information processing system such as the above-mentioned information processing system disclosed by Cray, Jr. More specifically, the operands are read from the operand registers after the content of one of the operand registers is renewed by the result. Therefore, the conventional information processing system is disadvantageous in that it takes useless time which is necessary for operands to go and return between the executing devices and the operand registers.

SUMMARY OF THE INVENTION

It is an object of this invention to provide an information processing system which comprises an instruction processing unit and in which a register renewal waiting control circuit is implemented by a reduced number of circuit elements.

It is another object of this invention to provide an information processing system operable without useless time.

An information processing system to which this invention is applicable, comprises a bank of general register assigned with register numbers, respectively, an instruction processing unit for processing, as a current instruction, each of program instructions fetched successively from a memory device to produce a start signal and for reading an operand from the general register of one of the register numbers that is indicated by the current instruction, and an executing unit indicated by the current instruction and responsive to the start signal for executing the current instruction in an execution time next succeeding the start signal. The program instructions include renewal instructions for renewing the general registers of the register numbers indicated by the respective renewal instructions. The instruction processing unit includes processing means for processing the current instruction to produce the start signal. According to this invention, the instruction processing unit comprises holding means for holding, as a held number, the register number indicated by one of the renewal instructions that is processed by the processing means as a current renewal instruction, decoding means for decoding the current renewal instruction to produce, as a machine cycle number, a number for machine cycles of which consists the execution time of the executing unit for the current renewal instruction, reducing means responsive to the start signal produced for the current renewal instruction for reducing one from the machine cycle number in each machine cycle after reception of the last-mentioned start signal to successively provide decreasing numbers, and coincidence finding means for finding coincidence between the held number and each of the register numbers indicated by the program instructions which should successively be processed by the processing means as successive instructions following the current renewal instruction, the coincidence finding means producing a coincidence signal whenever the coincidence is found. The instruction processing unit further comprises suspending means responsive to the coincidence signal for suspending the processing means for the successive instructions, and reading means responsive to the decreasing numbers for reading the operands from the general registers of the register numbers indicated by the successive instructions.

The instruction processing unit further comprises signal producing means responsive to the decreasing numbers for producing a releasing signal when one of the decreasing numbers is a predetermined number and releasing means responsive to the releasing signal for releasing the suspending means to restart the suspended processing unit.

According to another aspect, an information processing system further comprises a plurality of executing devices, each having an input port and an output port. The executing unit is one of the executing devices that is indicated by the current instruction. The renewal instructions include operation instructions. One of the executing devices that is indicated by each operation instruction produces a result of execution from the output port. Each of a first and a second particular one of the executing devices has a first and a second additional input port. The first and the second additional input ports of the first particular one of the executing devices are connected to the output ports of the first and the second particular ones of the executing devices, respectively. The executing unit is the second particular one of the executing devices. The instruction processing unit further comprises means for generating a selection signal indicating to select the second additional input port. The selection signal is supplied to the first particular one of the executing devices together with the start signal. The first particular one of the executing devices comprises selecting means responsive to the selection signal for selecting the second additional input port. Accordingly, the result of execution for the current instruction is taken into, as an operand, the first particular one of the executing devices which executes the successive operation instruction.

BRIEF DESCRIPTION OF THE DRAWING

FIG. 6 is a time chart for use in describing operation in the instruction processing unit shown in FIG. 2;

DESCRIPTION OF THE PREFERRED EMBODIMENTS

Figure 1:
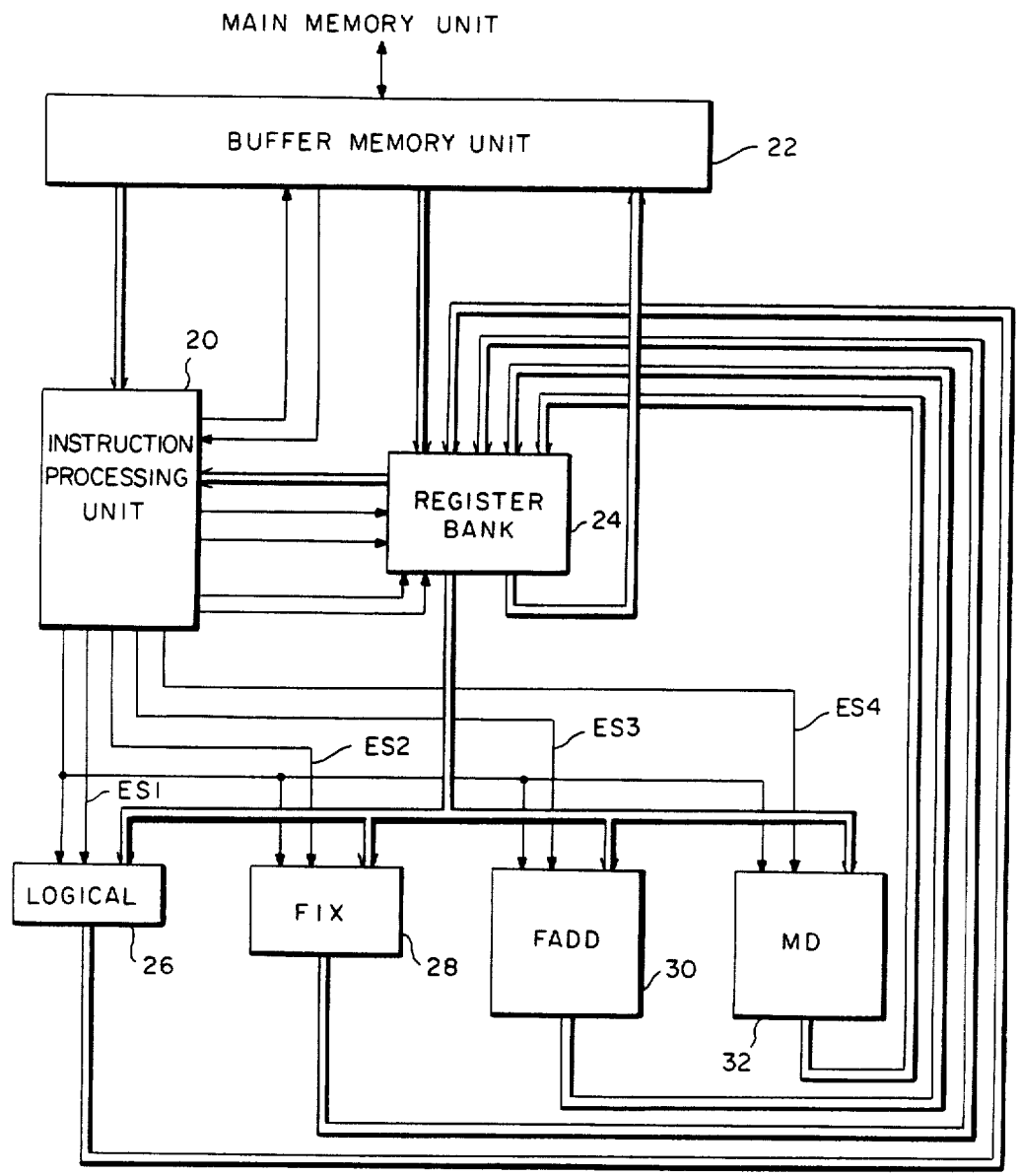
FIG. 1 is a block diagram of an information processing system according to a first embodiment of the instant invention.

Referring to FIG. 1, an information processing system according to a first embodiment of the present invention includes an instruction processing unit 20. The instruction processing unit 20 accesses a buffer memory unit 22 to successively fetch program instructions as fetched instructions. The instruction processing unit 20 processes each of the fetched instructions as a current instruction and produces a start signal.

The information processing system further comprises a register bank 24. The register bank 24 includes a plurality of general register (not individually shown), for example, 128 in number, assigned with register numbers or addresses, respectively. The register bank 24 further comprises a register (not shown) for temporarily holding the content read out of one of the general registers and an input selection circuit (not shown) for selecting either data delivered from the buffer memory unit 22 or results of execution supplied from arithmetic units which are the execution devices described heretobefore and will later be described in detail.

The program instructions include operation instructions, load instructions, and store instructions which will become clear as the description proceeds. Each operation instruction is for renewing the general register of the register number indicated thereby. Each load instruction is also for renewing the general register of the register number indicated thereby. Therefore, the operation instructions and the load instructions are herein collectively called renewal instructions.

It will be assumed that the information processing system comprises first through fourth arithmetic units. If the current instruction is a current operation instruction, the instruction processing unit 20 reads the register bank 24 to get contents of the general registers of the register numbers indicated by the current operation instruction as operands. The instruction processing unit 20 supplies the arithmetic units with the operands and delivers an arithmetic appointment signal AA and first through fourth execution start signals ES1, ES2, ES3, and ES4 to the first through the fourth arithmetic units depending on the current operation instruction.

If the current instruction is a current load instruction, the instruction processing unit 20 reads the register bank 24 to obtain the content of the general registers of the register numbers indicated by the current load instruction as a read content, calculates an operand address from the read content, and accesses the buffer memory unit 22. If the current instruction is a current store instruction, the instruction processing unit 20 similarly reads the register bank 24 to obtain the content of the general registers of the register numbers indicated by the current store instruction as a read content, calculates a store address from the read content, and accesses the buffer memory unit 22.

The instruction processing unit 20 gives the register bank 24 a write-in indication signal, a register number signal, and a selection indication signal. The write-in indication signal indicates writing the result of execution from the arithmetic units and load data from the buffer memory unit 22 collectively as write-in data. The register number signal indicates the register number of the general register in which the write-in data should be written. The selection indication signal is a signal for selecting one of the write-in data delivered from the arithmetic units and the buffer memory unit 22.

Therefore, when the renewal instruction is one of the operation instructions, one of the arithmetic units is used as the executing unit. When the renewal instruction is one of the load instructions, a memory device such as the buffer memory unit 22, is used as an executing unit. It should be noted that the result of execution returns to the register bank 24 from the arithmetic unit indicated by the operation instruction after an execution time next succeeding the start signal. The load data also return to the register bank 24 from the buffer memory unit 22 after another execution time, or a load time, next succeeding the start signal whenever no mishit occurs at the buffer memory unit 22. The execution time is measured in terms of machine cycles.

In the information processing system being illustrated, the first through the fourth arithmetic units are a logical operation (LOGICAL) unit 26, a fixed-point add-subtract (FIX) unit 28, a floating-point add-subtract (FADD) unit 30, and a multiply-divide (MD) unit 32. The LOGICAL unit 26 performs logical operation. The FIX unit 28 performs addition and subtraction on integer data and a shift operation. The FADD unit 30 performs addition and subtraction on floating-point data. The MD unit 32 performs multiplication and division.

Each of the general registers of the register bank 24 either produces an operand or is renewed. When the operand is read, the general register will be called an operand register. When selected for renewal, the general register will be named a renewal register. Each of the arithmetic units 26, 28, 30, and 32 receives the operands from the operand registers and delivers the result to the renewal register.

The instruction processing unit 20 comprises an instruction decode section which will later be described. The instruction decode section and the arithmetic units 26, 28, 30, and 32 are operable under pipeline control to process one instruction in each machine cycle. Although execution times of the arithmetic units are generally different from each other, it is possible to start one of the arithmetic units in a certain machine cycle without waiting completion of the execution of preceding instructions whenever the current operation instruction indicates the register numbers of the operand registers each of which is not equal to the register numbers of the renewal registers indicated by the preceding instructions.

A pair of eight-bit data are sent from the operand registers of the register bank 24 to the arithmetic units 26, 28, 30, and 32 as a first operand and a second operand. Output data are sent from each arithmetic unit to the renewal register of the register bank 24 as a result of execution.

Figure 2:
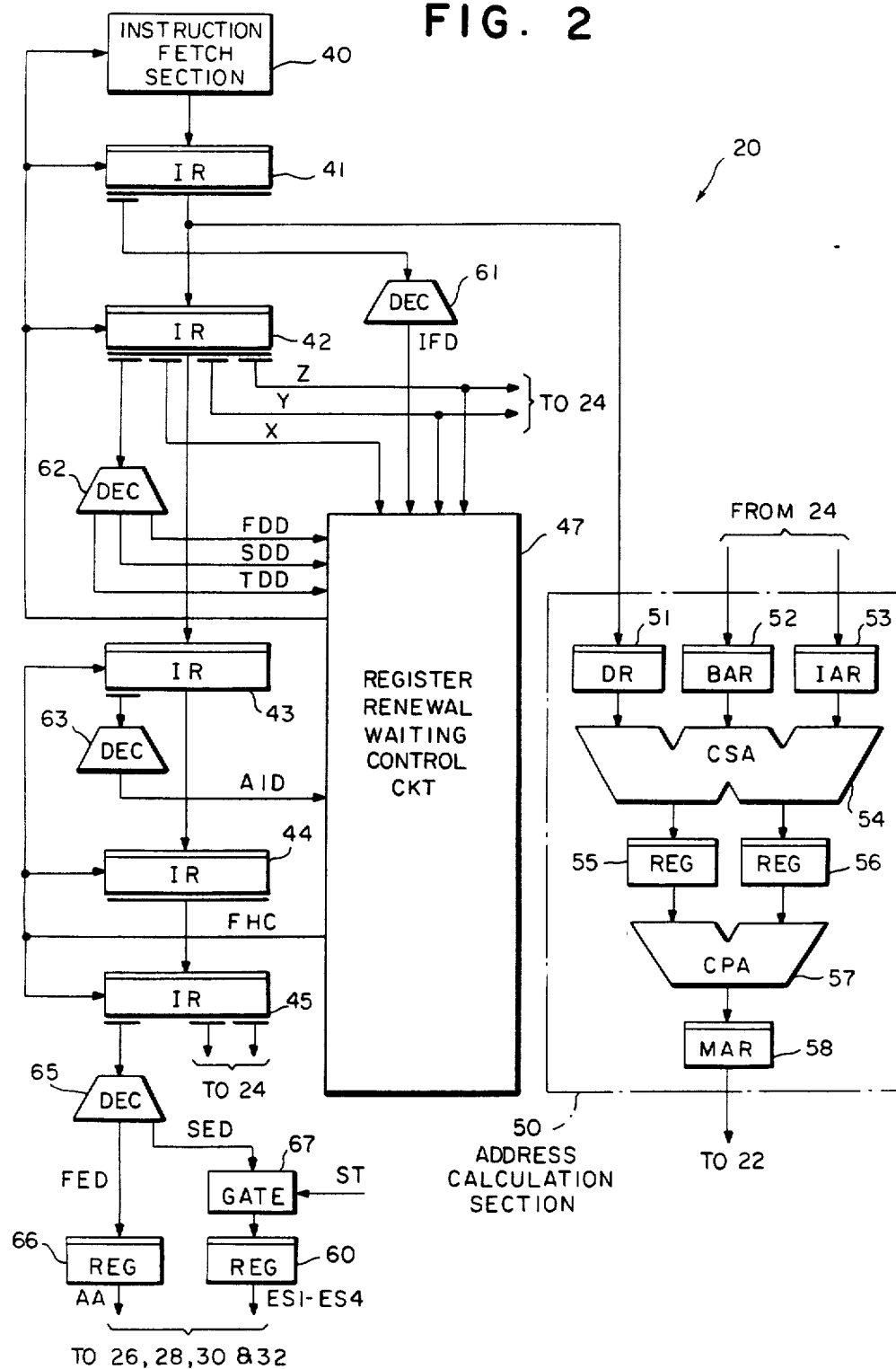
FIG. 2 is a block diagram of an instruction processing unit of the information processing system shown in FIG. 1.

Referring to FIG. 2 for a short while, the instruction processing unit 20 is operable under five-stage pipeline control in the manner which will later be described. The five stages of the pipeline control are an instruction fetch (IF) stage, a decode (D) stage, a first address calculation (A1) stage, a second address calculation (A2) stage, and an execution (E) stage.

The instruction processing unit 20 comprises an instruction fetch section 40, the instruction decode section described above, a register renewal waiting control circuit 47, and an address calculation section 50. The instruction decode section comprises first through fifth instruction registers 41, 42, 43, 44, and 45. The instruction registers 41 through 45 correspond to IF, D, A1, A2, and E stages, respectively.

The register renewal waiting control circuit 47 controls renewal of the general registers, suspension of operation of the instruction registers, and start of the arithmetic units.

The phrase "suspension of operation of the instruction register" means making the instruction register in a suspended condition where the instruction register holds content stored therein for at least two machine cycles without delivering the content as the effective data output.

The address calculation section 50 is used when the program instruction is either the load instruction or the store instruction.

Figure 3:
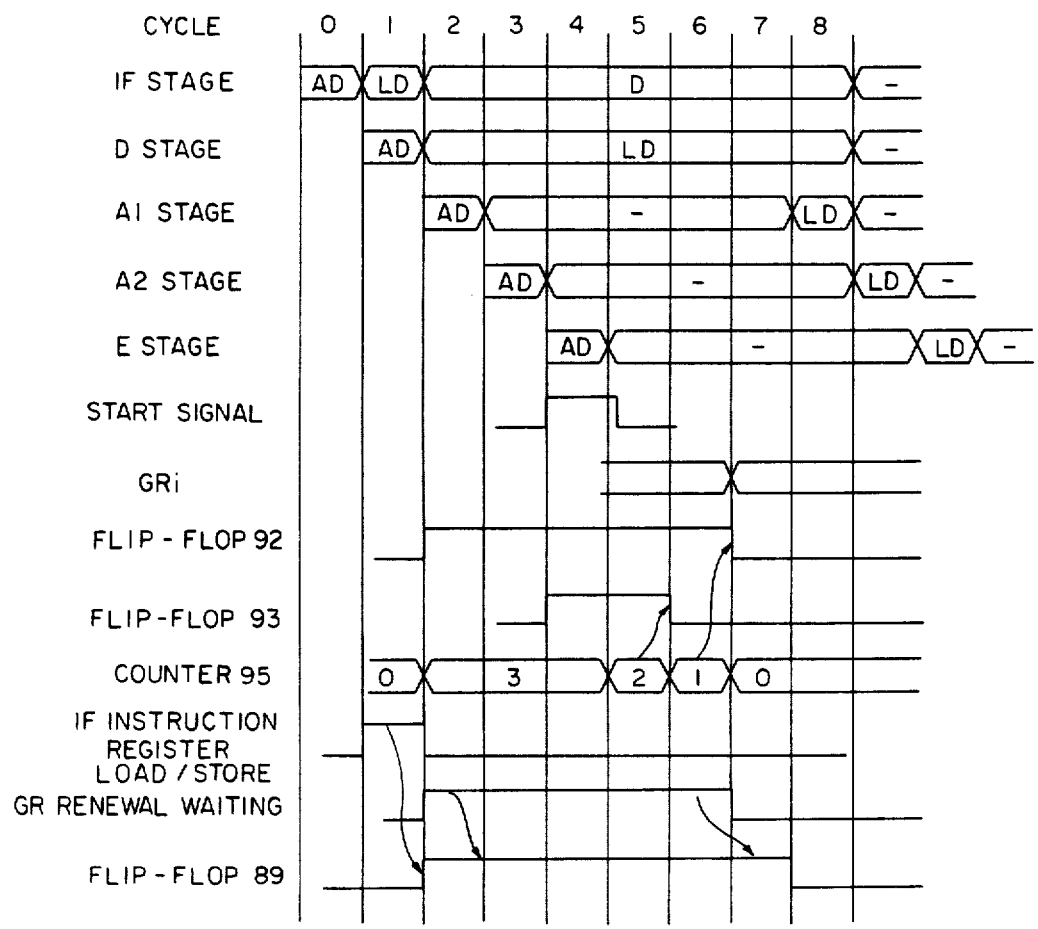
FIG. 3 shows formats of instruction words for use in the instruction processing unit shown in FIG. 2.

Turning to FIG. 3, each instruction is given to the instruction processing unit 20 as an instruction word of either of two formats shown. The instruction word of the operation instruction is four bytes long and comprises one byte of an operation code OP and three one-byte general register (GR) number fields X, Y, and Z. The GR number field X indicates the register number of the general register in which the result of execution should be stored, namely, the register number of the renewal register. The GR number fields Y and Z show the register numbers of the general registers from which the first and the second operands should be read, namely, the register numbers of the operand registers.

The instruction word of the load instruction or the store instruction is eight bytes long and comprises a four-byte displacement part D in addition to the operation code OP and the GR number fields X, Y, and Z. The GR number field X shows the register number of the general register in which the load data should be stored, namely, the register number of the renewal register when the program instruction is the load instruction. The GR number field X shows the register number of the general register from which the store data for the buffer memory unit 22 should be read when the program instruction is the store instruction. The GR number fields X and Y show the register numbers of the general registers which should be used for the address calculation.

Turning back to FIG. 2, the address calculation section 50 comprises a displacement register (DR) 51, a base address register (BAR) 52, and an index address register (IAR) 53. A carry save adder (CSA) 54 is for calculating two intermediate results of address addition. Registers 55 and 56 are for holding the intermediate results. The address calculation section 50 further comprises a two-input adder (CPA) 57 and a memory address register (MAR) 58.

In the D stage, contents of two general registers of the register bank 24 are read and used for the address calculation. In the E stage, the operands are read from the operand registers of the register bank 24. The A1 and A2 stages are for calculating the operand or the store address at the address calculation section 50 when the program instructions are the load instructions or the store instructions. During the calculation, the load instructions or the store instructions are sent from the instruction register 42 to the instruction register 45 through the instruction registers 43 and 44. When the program instructions are the operation instructions, the operation instructions are also sent from the instruction register 42 to the instruction register 45 through the instruction registers 43 and 44.

If the current instruction is one of the operation instructions, the register renewal waiting control circuit 47 judges in the E stage whether or not the operand register indicated by each operation instruction is in a renewal waiting state and whether or not the input selection circuit of the register bank 24 is available at an expected machine cycle. When all condition is complete, a register 60 is set to start the arithmetic units in the manner which will later become clear.

In the IF stage, an IF stage instruction decoder 61 decodes the operation code OP of the program instruction set in the IF stage instruction register 41 as an IF stage instruction. The IF stage instruction decoder 61 produces an IF stage decoded signal IFD. The IF stage instruction decoder 61 produces a logical "1" level as the IF stage decoded signal IFD when the IF stage instruction is one of the load instructions and the store instructions.

In the D stage, a D stage instruction decoder 62 decodes the operation code OP of the program instruction set in the D stage instruction register 42 as a D stage instruction and produces a D stage decoded signal. The D stage decoded signal comprises first, second, and third D stage decoded signals FDD, SDD, and TDD. The D stage instruction decoder 62 produces the logical "1" level as the first D stage decoded signal FDD when the D stage instruction is one of the renewal instructions. The D stage instruction decoder 62 produces the machine cycle number for the D stage instruction as the second D stage decoded signal SDD. The D stage instruction decoder 62 produces the logical "1" level as the third D stage decoded signal TDD when the D stage instruction is one of the load instructions and the store instructions.

In the A1 stage, an A1 stage instruction decoder 63 decodes the operation code OP of the program instruction set in the A1 stage instruction register 43 as an A1 stage instruction and produces an A1 stage decoded signal A1D which is a decoded signal of four bits in length. The four bits correspond to the arithmetic units 26, 28, 30, and 32. When the A1 stage instruction is one of the operation instructions, the A1 stage instruction decoder 63 sets "1" at a bit corresponding to the arithmetic unit which should be used for execution of the operation instruction.

In the E stage, an E stage instruction decoder 65 decodes the operation code OP of the program instruction set in the E stage instruction register 45 as an E stage instruction and produces an E stage decoded signal. The E stage decoded signal comprises first and second E stage decoded signals FED and SED. The second E stage decoded signal SED is four bits in length. When the E stage instruction is one of the operation instructions, the first E stage decoded signal FED is the arithmetic appointment signal AA, which is delivered via a register 66 to the arithmetic units 26, 28, 30, and 32. When the E stage instruction is one of the operation instructions, the second E stage decoded signal SED is set "1" at a bit corresponding to the arithmetic unit which should be used for execution of the operation instruction. The second E stage decoded signal SED is set in the register 60 via a gate 67. The four bits set in the register 60 become the execution start signal ES1 through ES4.

When the operation instruction indicates the LOGICAL unit 26, the operation instruction will be called a LOGICAL instruction. When the operation instruction indicates the FIX unit 28, the operation instruction similarly will be called a FIX instruction. When the operation instruction indicates the FADD unit 30, the operation instruction likewise will be called an FADD instruction. When the operation instruction indicates the MD unit 32, the operation intruction will be called an MD instruction.

When the E stage instruction is the LOGICAL instruction, the execution start signal ES1 becomes the logical "1" level. When the E stage instruction in the FIX instruction, the execution start signal ES2 becomes the logical "1" level. When the E stage instruction is the FADD instruction, the execution start signal ES3 becomes the logical "1" level. When the E stage instruction is the MD instruction, the execution start signal ES4 becomes the logical "1" level.

Figure 4:
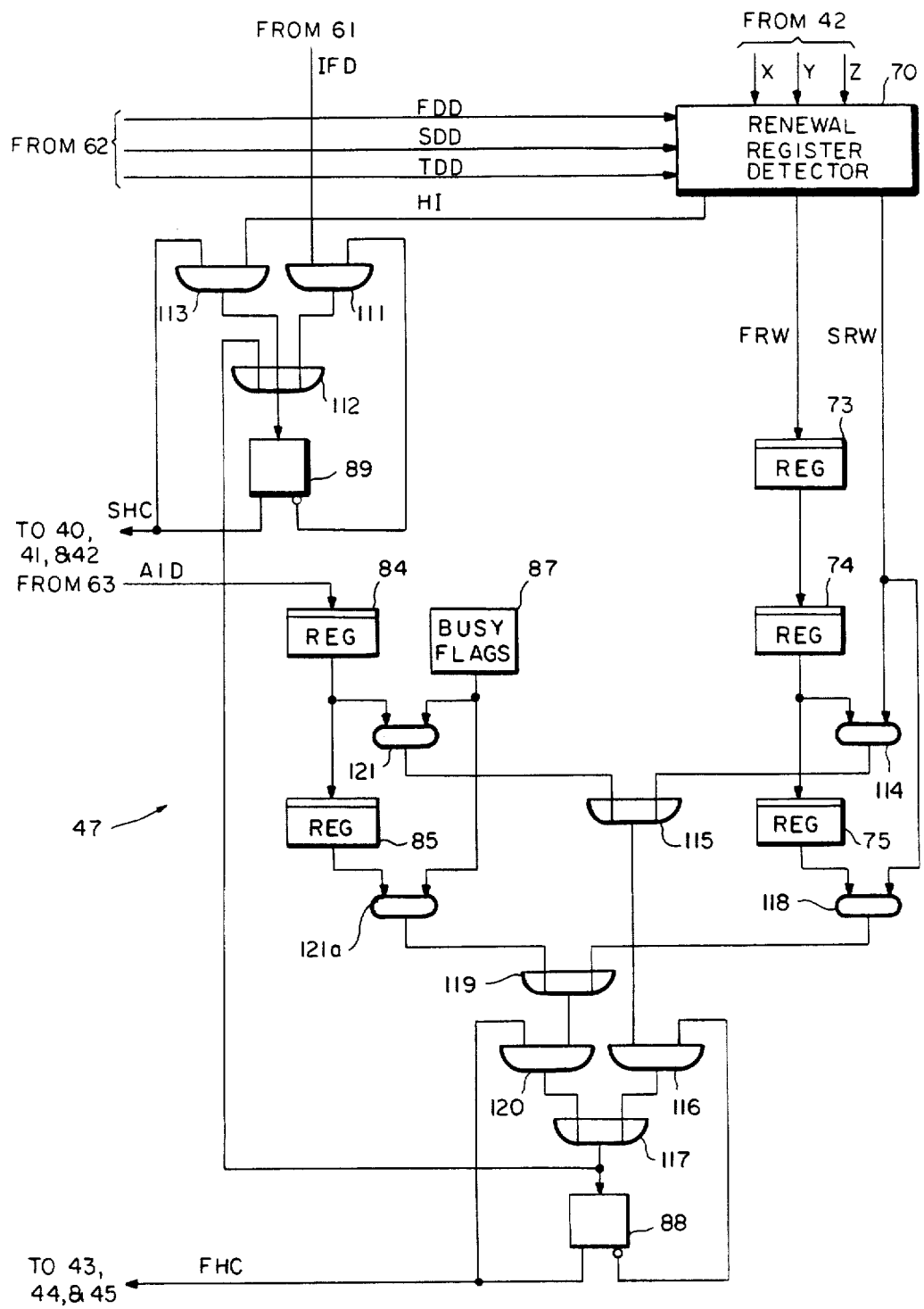
FIG. 4 is a block diagram of a register renewal waiting control circuit of the instruction processing unit shown in FIG. 2.

Referring temporarily to FIG. 4, the register renewal waiting control circuit 47 comprises a renewal register detector 70 which will later be described. The register renewal waiting control circuit 47 further comprises renewal waiting check index registers 73, 74, and 75 corresponding to A1, A2, and E stages, respectively. Busy check index registers 84 and 85 correspond to A2 and E stages, respectively. A busy flag circuit 87 is for indicating availability of the arithmetic units. A first flip-flop 88 of a delay type is for suspending operation of the A1, A2 and E stage instruction registers 43, 44, and 45. A second flip-flop 89 of a delay type is for suspending operation of the instruction fetch section 40 (FIG. 2) and the IF and D stage instruction registers 41 and 42.

Figure 5:
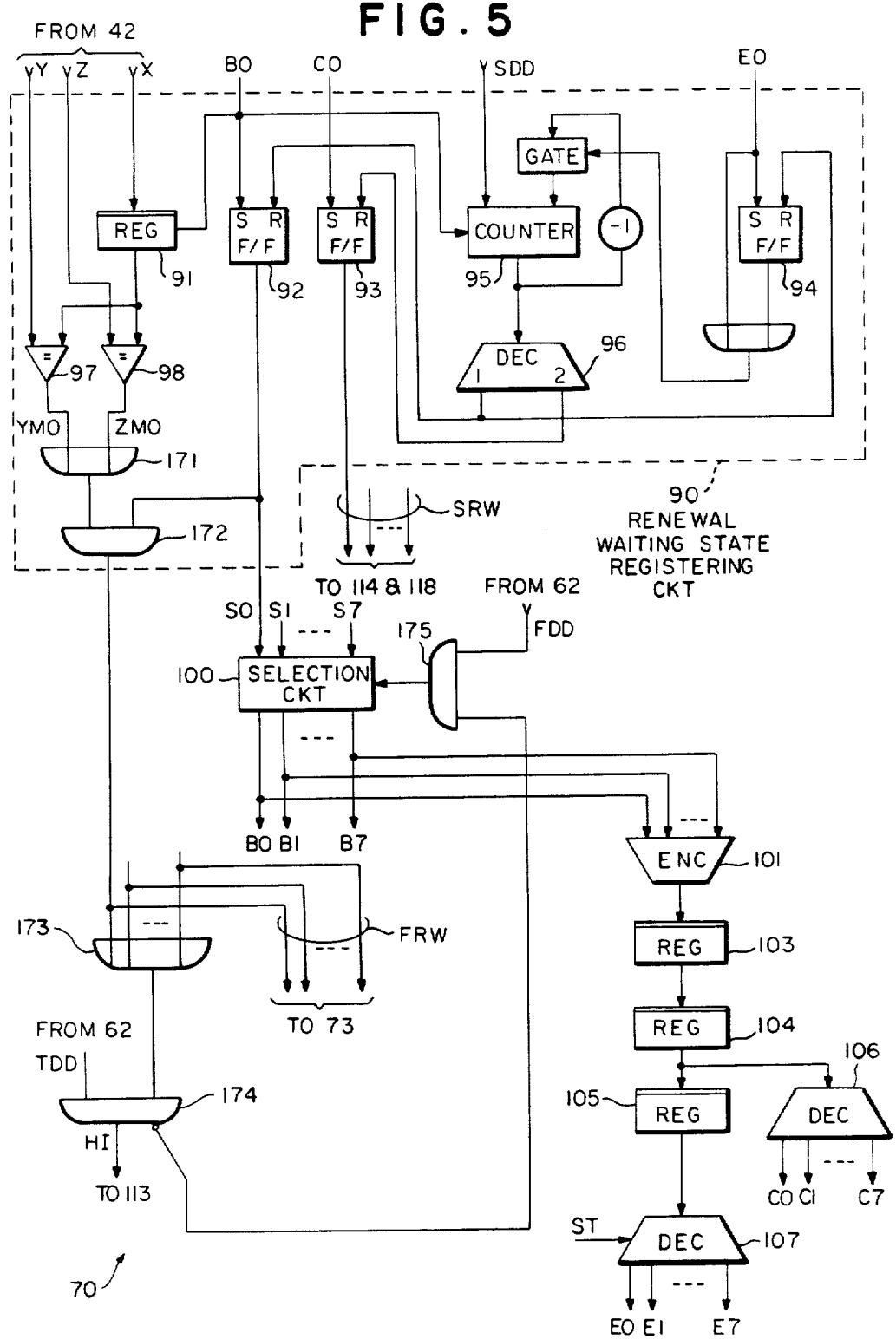
FIG. 5 is a block diagram of a renewal register detector of the register renewal waiting control circuit shown in FIG. 4.

Turning to FIG. 5, the renewal register detector 70 comprises eight renewal waiting state registering circuits assigned with entry numbers 0 through 7. One of the renewal waiting state registering circuits is shown at 90. It will be assumed that the renewal waiting state registering circuit 90 is given the entry number 0. Seven other renewal waiting state registering circuits are operable like the renewal waiting state registering circuit 90.

The renewal waiting state registering circuit 90 comprises a renewal register number register 91 for holding, as a held number, the register number of the general register which should be renewed. Flip-flops 92, 93, and 94 of an RS type are for indicating states of the general register of the held number in the manner which will later be described. An execution time counter 95 is preset with a machine cycle number representative of the number of machine cycle or cycles for the execution time of one of the arithmetic units 26, 28, 30, and 32 that is put into operation by the renewal instruction. The execution time counter 95 is accompanied by circuitry for reducing one from the machine cycle number in each machine cycle after reception of the start signal to provide successively decreasing numbers.

A decoder 96 is for decoding each decreasing number. A first coincidence circuit 97 is for detecting coincidence between the held number and the register number of the GR number field Y of the program instruction set in the D stage instruction register 42. A second coincidence circuit 98 is for detecting coincidence between the held number and the register number of the GR number field Z of the program instruction set in the D stage instruction register 42. The first and the second coincidence circuits 97 and 98 produce the logical "1" level as first and second coincidence signals YM0 and ZM0 whenever the coincidence is detected.

The renewal register detector 70 further comprises a selection circuit 100 for receiving output signals S0 through S7 fron the flip-flops, such as 92, of the respective renewal waiting state registering circuits and for producing a selection signal of eight bits B0 through B7 which correspond to the entry numbers 0 through 7. Depending on the renewal waiting state registering circuit or circuits, such as 90, which are in use, the selection circuit 100 selects one of other renewal waiting state registering circuits as a selected renewal waiting state registering circuit that has a least entry number. The selection signal is delivered to a set terminal of the flip-flop, such as 92, in the selected renewal waiting state registering circuit.

An encoder 101 encodes the selection signal into an entry number signal and an effective bit signal. The entry number signal and the effective bit signal are set successively in registers 103, 104, and 105 in A1, A2, and E stages, respectively. A decoder 106 decodes the entry number signal and the effective bit signal set in the A2 stage register 104 and produces a decoded signal comprising eight bits C0 through C7 corresponding to entry numbers 0 through 7 for use in setting the flip-flop which correspond to the flip-flop 93 in the selected renewal waiting state registering circuit. Responsive to the start signal indicated at ST, another decoder 107 decodes the entry number signal and the effective bit signal which are set in the E stage register 105. The decoder 107 thereby produces a decoded signal comprising eight bits E0 through E7 corresponding to entry numbers 0 through 7 for use in setting the flip-flop which corresponds to the flip-flop 94 in the selected renewal waiting state registering circuit.

The renewal register detector 70 produces a hold indication signal HI of one bit and first and second renewal waiting check signals FRW and SRW each of which comprises eight bits corresponding to the entry numbers 0 through 7, respectively.

More particularly, both the first and the second coincidence signals YM0 and ZM0 are delivered to input terminals of an OR gate 171. The OR gate 171 delivers an output signal to an input terminal of an AND gate 172. The AND gate 172 has another input terminal which receives an output signal S0 from the flip-flop 92.

The AND gate 172 delivers an output signal to one of eight input terminals of an OR gate 173. Other seven input terminals of the OR gate 173 receive output signals from AND gates, such as 172, of other seven renewal waiting state registering circuits. The OR gates 173 delivers an output signal to an input terminal of an AND gate 174. The AND gate 174 has another input terminal which receives the third D stage decoded signal TDD from the D stage instruction decoder 62 (FIG. 2). The AND gate 174 produces the hold indication signal HI which is delivered to an input terminal of an AND gate 113 (FIG. 4). Output signals from the AND gates, such as 172, are delivered to the A1 stage renewal waiting check index register 73 (FIG. 4) as the first renewal waiting check signal FRW. Output signals from the flip-flops, such as 93, provides the second renewal waiting check signal SRW, which are delivered to input terminals of first and second combinational circuits 114 and 118 (FIG. 4).

An inverted output signal from the AND gate 174 is delivered to an input terminal of an AND gate 175. Another input terminal of the AND gate 175 receives the first D stage decoded signal FDD from the D stage instruction decoder 62 (FIG. 2). An output signal from the AND gate 175 is delivered to the selection circuit 100 as a selection start signal.

In the renewal waiting state registering circuit 90, the decoder 96 produces a first reset signal to the flip-flops 92 and 94 when the content of the counter 95 is "1". The decoder 96 supplies a second reset signal to the flip-flop 93 when the content of the counter 95 is "2". In other words, the first reset signal is produced when the decreasing number is reduced to unity. The second reset signal is produced when the decreasing number becomes equal to two one machine cycle prior to production of the first reset signal.

Referring again to FIG. 2 in addition to FIG. 4, the first flip-flop 88 delivers a non-inverted output signal as a first holding control signal FHC to the A1, A2, and E stage instruction registers 43, 44, and 45. When the first holding control signal FHC has the logical "1" level, the A1, A2, and E stage instruction registers 43, 44, and 45 are put into the suspended condition. The second flip-flop 89 delivers a non-inverted output signal as a second holding control signal SHC to the instruction fetch section 40 and the IF and the D stage instruction registers 41 and 42. When the second holding control signal SHC has the logical "1" level, the instruction fetch section 40 and the IF and the D stage instruction registers 41 and 42 are made inoperative or suspended.

Referring to FIGS. 2 through 5, when the renewal instruction is set into the D stage instruction register 42 from the IF stage instruction register 41, the D stage instruction decoder 62 produces the first D stage decoded signal FDD of the logical "1" level. At the same time, one of the renewal waiting state registering circuits, for example, the renewal waiting state registering circuit 90 of the entry number 0, is selected by the selection circuit 100.

When the first holding control signal FHC is of a logical "0" level and when the second holding control signal SHC is also of the logical "0" level, the renewal instruction is set into the A1 stage instruction register 43 from the D stage instruction register 42. At the same time, the register number of the GR number field X of the renewal instruction is set in the renewal register number register 91, the machine cycle number as the second D stage decoded signal SDD is set in the execution time counter 95, and the flip-flop 92 is set by the B0 bit of the selection signal from the selection circuit 100. The entry number signal representative of the entry number 0 and the effective bit signal are set in the A1 stage register 103.

When the renewal instruction set in the A1 stage instruction register 43 is set into the E stage instruction register 45 via the A2 stage instruction register 44, the flip-flop 93 is set by the C0 bit of the decoded signal from the A2 stage decoder 106.

When execution of the renewal instruction set in the E stage instruction register 45 is started, the flip-flop 94 is set by E0 bit of the decoded signal E0 from the E stage decoder 107, so that decrement of the execution time counter 95 is started. When the content of the counter 95 is "2", the flip-flop 93 is reset through the decoder 96. When the content of the counter 95 is "1", the flip-flops 92 and 94 are reset through the decoder 96.

Operation of the instruction processing unit 20 will be described hereinunder.

Referring to FIG. 6, the current renewal instruction is an addition (AD) instruction which is one of the operation instructions and renews the general register of the register number i ($0 \leq i \leq 127$). The next successive instruction is the load (LD) instruction which uses the general register of the register number i to calculate the operand address. Zeroth through eighth machine cycles are indicated by numerals 0 through 8 along a first or top line in FIG. 6.

In the first machine cycle represented by 1, the AD instruction is set into the D stage instruction register 42 from the IF stage instruction register 41 and the LD instruction is set into the IF stage instruction register 41 from the instruction fetch section 40. The D stage instruction decoder 62 decodes the addition instruction set in the D stage instruction register 42. The D stage instruction decoder 62 produces the logical "1" level as the first D stage decoded signal FDD, the machine cycle number "3" necessary for execution of the AD instruction as the second D stage decoded signal SDD, and the logical "0" level as the third D stage decoded signal TDD. The IF stage instruction decoder 61 decodes the LD instruction set in the IF stage instruction register 41 and produces the logical "1" level as the IF stage decoded signal IFD.

In the second machine cycle represented by 2, the AD instruction is set into the A1 stage instruction register 43 from the D stage instruction register 42 while the LD instruction is set into the D stage instruction register 42 from the IF stage instruction register 41. At the same time, a renewal waiting state of the general register of the register number i is set in the renewal waiting state registering circuit 90 of the entry number 0. More specifically, the register number i which is the register number of the GR number field X in the AD intruction is set in the renewal register number register 91 from the D stage instruction register 42. The machine cycle number "3" necessary for execution of the AD instruction is preset in the execution time counter 95, and the flip-flop 92 is set by the B0 bit of the selection signal from the selection circuit 100. Furthermore, the IF stage decoded signal IFD is delivered to the flip-flop 89 via an AND gate 111 and an OR gate 112, so that the flip-flop 89 is set and produces the logical "1" level as the second holding control signal SHC. Therefore, the instruction fetch section 40 and the IF and D stage instruction registers 41 and 42 are put into the suspended condition by the second holding control signal SHC. This is because the D stage instruction register 42 must be suspended for processing the next successive instruction when any one of the general registers, which is used for execution of the load or store instruction, is the renewal waiting state. Although the D stage instruction register 42 is inoperative during one clock or one machine cycle even when no general register is in the renewal waiting state, there is no loss to efficiency. Because the latter half four bytes of the LD instruction is the displacement D which is not set into the D stage instruction register 42.

Furthermore, the register number i is one of the register numbers of the GR number fields Y and Z of the LD instruction set in the D stage instruction register 42. Accordingly, one of the first and the second coincidence circuits 97 and 98 produces the logical "1" level as one of the first and the second coincidence signals YM0 and ZM0. Therefore, the AND gate 174 produces the logical "1" level as the hold indication signal HI. The hold indication signal HI is delivered to the flip-flop 89 via the AND gate 113 and the OR gate 112 so that the flip-flop 89 is still maintained in the set condition. Therefore, the instruction fetch section 40 and the IF and the D stage instruction registers 41 and 42 are still maintained in the suspended condition. Furthermore, the entry number 0 as the entry number signal and the effective bit signal are set in the A1 state register 103.

In the third machine cycle denoted by 3, the AD instruction is set into the A2 stage instruction register 44 from the A1 stage instruction register 43. But, the LD instruction is held in the D stage instruction register 42 and is not set into the A1 stage instruction register 43.

In the fourth machine cycle represented by 4, the AD instruction is set into the E stage instruction register 45 from the A2 instruction register 44 and the RS flip-flop 93 is set by C0 bit of the decoded signal from the A2 stage decoder 106. At the same time, the start signal is generated so that bit E0 of the decoded signal sent from the decoder 107 is the logical "1" level. Therefore, the decrement of the execution time counter 95 is started.

In the fifth machine cycle denoted by 5, the content of the execution time counter 95 becomes "2". Therefore, the flip-flop 93 is reset at the next or the sixth machine cycle represented by 6.

In the sixth machine cycle, the content of the execution time counter 95 becomes "1". Accordingly, the flip-flops 92 and 94 are reset at the next or the seventh machine cycle represented by 7.

In the seventh machine cycle, since the flip-flop 92 is reset as described above, the AND gate 172 rejects any one of the logical "1" level signal of the first and the second coincidence signals YM0 and ZM0 sent from the first and the second coincidence circuits 97 and 98, and produces the logical "0" level. Therefore, the hold indication signal HI from the AND gate 174 is the logical "0" level.

In the eighth machine cycle, since the hold indication signal HI is the logical "0" level as described above, the flip-flop 89 is reset so that the second holding control signal SHC changes from the logical "1" level to "0" level. Therefore, the instruction fetch section 40 and the IF and D stage instruction registers 41 and 42 are released from the suspended condition so that the LD instruction held in the D stage instruction register 42 is set into the A1 stage instruction register 43 in the next machine cycle.

Figure 7:
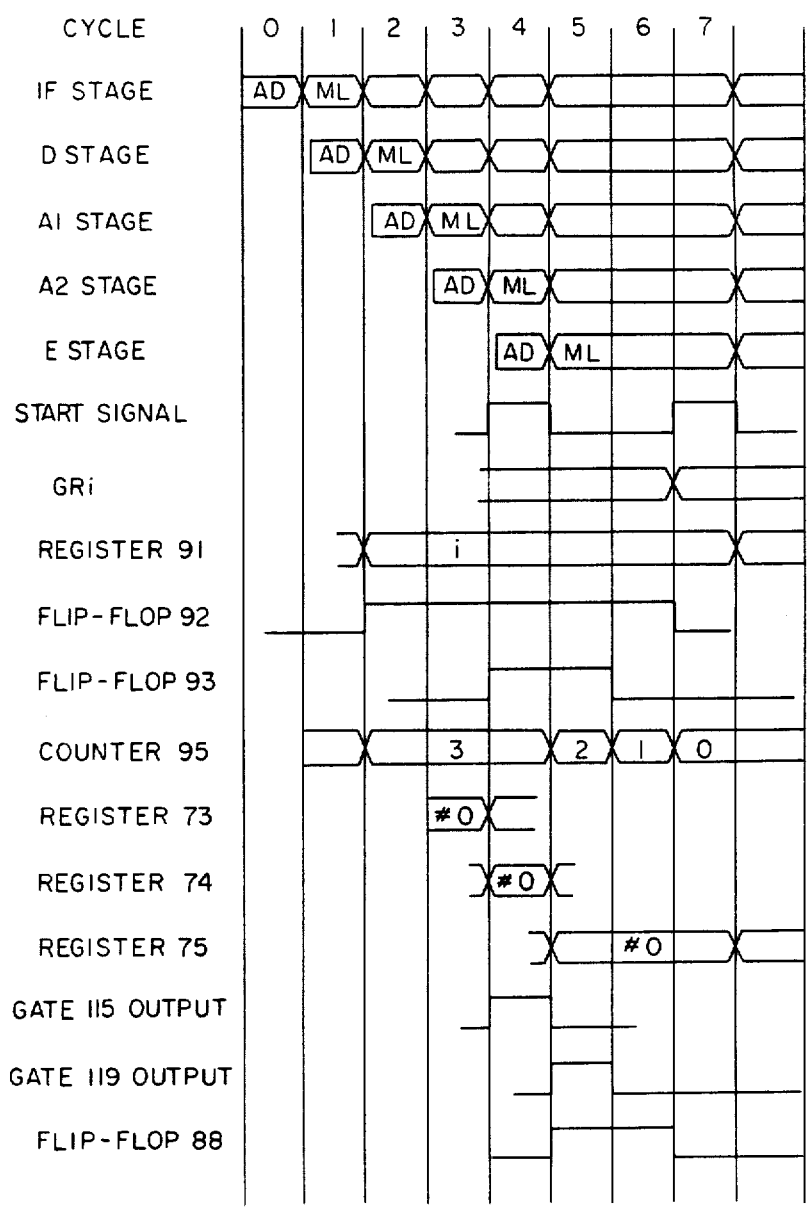
FIG. 7 is another time chart for use in describing operation in the instruction processing unit shown in FIG. 2.

Referring to FIG. 7, another time chart is shown in connection with another case when the current renewal instruction is the addition (AD) instruction with the next successive instruction being a multiplication (ML) instruction. The AD instruction indicates to renew the general register of the register number i. The ML instruction indicates to use the general register of the register number i as one of the operand registers. Zeroth through seventh machine cycles are indicated along a first or top line in FIG. 7.

In the first machine cycle denoted by 1, the AD instruction is set into the D stage instruction register 42 from the IF stage instruction register 41 and the ML instruction is set into the IF stage instruction register 41 from the instruction fetch section 40. The D stage instruction decoder 62 decodes the AD instruction set in the D stage instruction register 42. The D stage instruction decoder 62 then produces the logical "1" level as the first D stage decoded signal FDD, the machine cycle number "3" necessary for execution of the AD instruction as the second D stage decoded signal SDD, and the logical "0" level as the third D stage decoded signal TDD. The IF stage instruction decoder 61 decodes the ML instruction set in the IF stage instruction register 41 and produces the logical "0" level as the IF stage decoded signal IFD.

In the second machine cycle represented by 2, the AD instruction is set into the A1 stage instruction register 43 from the D stage instruction register 42, the register number i indicated by the AD instruction is set in the renewal register number register 91, the machine cycle number "3" is preset in the execution time counter 95. The flip-flop 92 is set by B0 bit of the selection signal from selection circuit 100. At the same time, the ML instruction is stored into the D stage instruction register 42 from the IF stage instruction register 41. The register number i indicated by the ML instruction is supplied to either one of the first and second coincidence circuits 97 and 98, and is compared with the content of the renewal register number register 91. Since the content of the register 91 is i, either the first coincidence circuit 97 or the second coincidence circuit 98 produces the logical "1" level so that bit zero of the first renewal waiting check signal FRW is the logical "1" level.

In the third machine cycle denoted by 3, the AD instruction is stored into the A2 stage instruction register 44 from the A1 stage instruction register 43 and the ML instruction is set into the A1 stage instruction register 43 from the D stage instruction register 42. At the same time, the first renewal check signal FRW is supplied to the A1 stage renewal waiting check index register 73.

In the fourth machine cycle indicated by 4, the AD instruction is set in the E stage instruction register 45 and the ML instruction is set in A2 stage instruction register 44. At the same time, the flip-flop 93 is set by C0 bit of the decoded signal from A2 stage decoder 106, so that bit zero of the second renewal waiting check signal SRW is the logical "1" level. Furthermore, content of the A1 stage renewal waiting check index register 73 is set in the A2 stage renewal waiting check index register 74. The first combinational circuit 114 checks the content of the A2 stage renewal waiting check index register 74 with the second renewal waiting check signal SRW and produces the logical "1" level. Furthermore, the start signal is generated so that the decrement of the execution time counter 95 is started.

In the fifth machine cycle, the logical "1" level sent from the first combinational circuit 114 is delivered to the flip-flop 88 via an OR gate 115, an AND gate 116, and an OR gate 117 as well as to the flip-flop 89 through the OR gate 115, the AND gate 116, the OR gate 117 and the OR gate 112. Thus, both flip-flops 88 and 89 are set and produce the logical "1" level as the first and the second holding control signals FHC and SHC, respectively. Therefore, all stage instruction registers 41, 42, 43, 44, and 45 and the instruction fetch section 40 are put into the suspended condition by the first and the second holding control signals FHC and SHC. At the same time, the ML instruction is set into E stage instruction register 45. Furthermore, content of the A2 stage renewal waiting check index register 74 is stored into the E stage renewal waiting check index register 75. The second combinational circuit 118 checks the content of the E stage renewal waiting check index register 75 with the second renewal check signal SRW and produces the logical "1" level. When content of the execution time counter 95 is "2", the flip-flop 93 is reset by the output signal from the decoder 96 at the sixth machine cycle.

In the sixth machine cycle represented by 6, the logical "1" level sent from the second combinational circuit 118 is delivered to the flip-flop 88 via an OR gate 119, an AND gate 120, and the OR gate 117 as well as to the flip-flop 89 through the OR gate 119, the AND gate 120, the OR gate 117, and the OR gate 112. Accordingly, both flip-flops 88 and 89 are continuously set. After the flip-flop 93 is reset, the second combinational circuit 118 produces the logical "0" level at the seventh machine cycle indicated by 7.

In the seventh machine cycle, the combinational circuit 118 produces the logical "0" level so that both flip-flops 88 and 89 are reset. Therefore, all stage instruction registers 41, 42, 43, 44, and 45 and the instruction fetch section 40 are released from the suspended condition.

Operation of busy check of the arithmetic units will be described hereinunder.

In the A1 stage, when the program instruction set in the A1 stage instruction register 43 is one of the operation instructions, the decoder 63 decodes the operation instruction set in the A1 stage instruction register 43 and produces the four-bit A1 stage decoded signal A1D having "1" at a bit corresponding to a prescribed arithmetic unit indicated by the operation instruction. The A1 stage decoded signal A1D is successively set in the busy check index registers 84 and 85 corresponding to A2 and E stages, respectively.

When the arithmetic units are not available, the busy flag circuit 87 arranged corresponding to the arithmetic unit is the logical "1" level. Setting and resetting of the busy flag circuit 87 are carried out before two machine cycle from a start and an end of the actual busy state of the arithmetic units, respectively. While the operation instruction is set in the A2 stage instruction register 44, the busy state of the prescribed arithmetic unit is checked by a third combinational circuit 121. While the operation instruction is set in the E stage instruction register 45, the busy state of the prescribed arithmetic unit is checked by a fourth combinational circuit 121a. If the prescribed arithmetic unit is not busy and the other condition is satisfied, an E stage flip-flop (not shown) for producing the start signal ST is set. The start signal ST sent from the flip-flop is delivered to the prescribed arithmetic unit after lapse of another one stage. The busy flag circuit 87 is reset by an execution time counter similar to the foregoing execution time counter 95.

Figure 8:
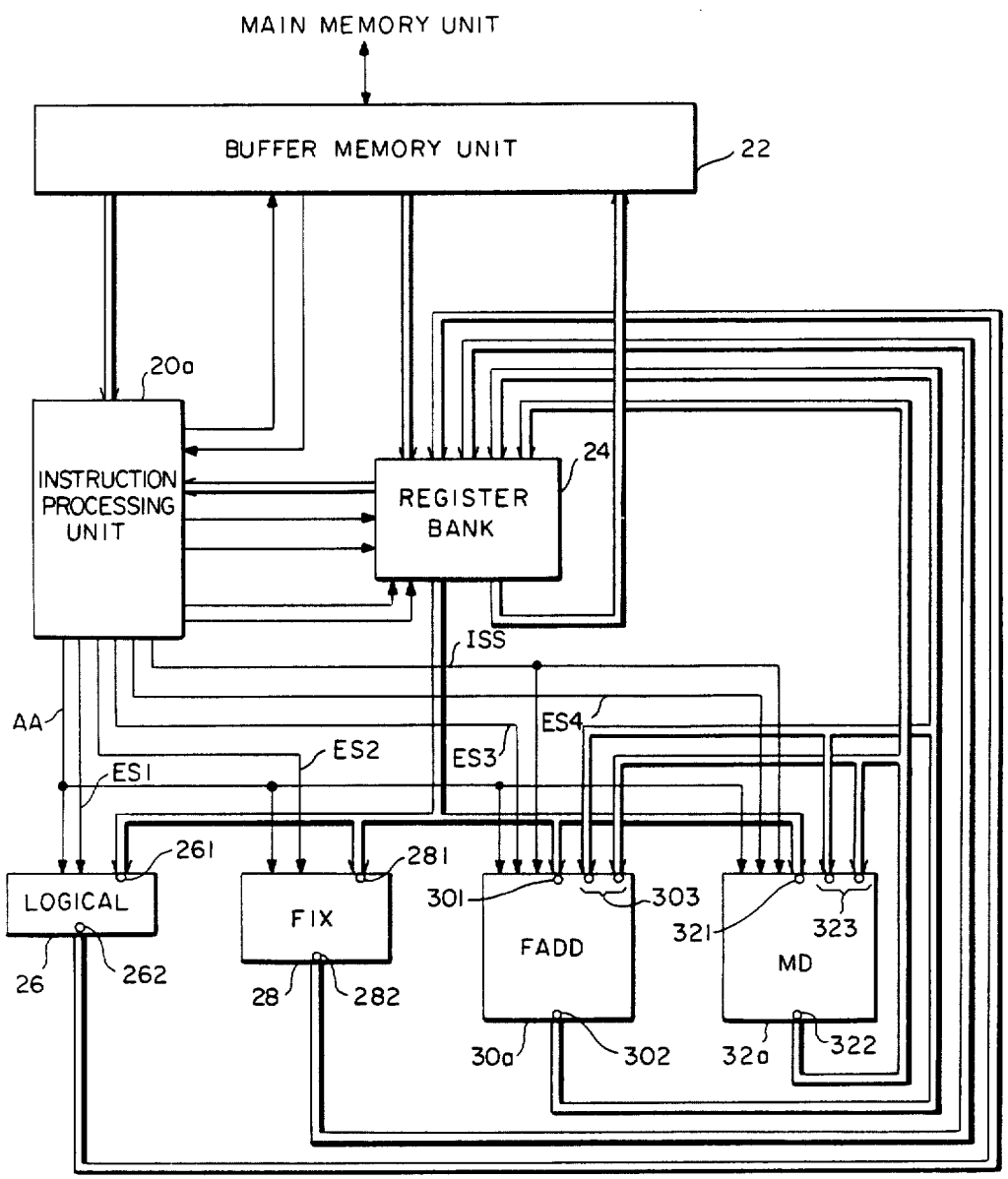
FIG. 8 is a block diagram of an information processing system according to a second embodiment of this invention.

Referring to FIG. 8, an information processing system according to a second embodiment of the present invention includes similar circuit portions designated by like reference numerals as in FIG. 1.

Arithmetic units or executing devices 26, 28, 30a, and 32a have input ports 261, 281, 301, and 321, and output ports 262, 282, 302, and 322, respectively. One of the arithmetic units is indicated by the operation instruction to produce the result of execution from the output port. FADD unit 30a and MD unit 32a further have additional input ports 303 and 323, respectively. The additional input port 303 of the FADD unit 30a is connected to the output port 302 of the FADD unit 30a and to the output port 322 of the MD unit 32a. The additional input port 323 of the MD unit 32a is connected to the output port 302 of the FADD unit 30a and the output port 322 of the MD unit 32a.

The instruction processing unit 20a produces an input selection signal ISS as well as the arithmetic appointment signal AA and the execution start signals ES1 through ES4. The input selection signal ISS is delivered to the FADD unit 30a and the MD unit 32a. Each of the FADD unit 30a and the MD unit 32a includes an input selector which will later be described. The input selector responsive to the input selection signal ISS selects each of input data which comprises the operand sent from the register bank 24 and the results sent from the FADD unit 30a and the MD unit 32a.

Figure 9:
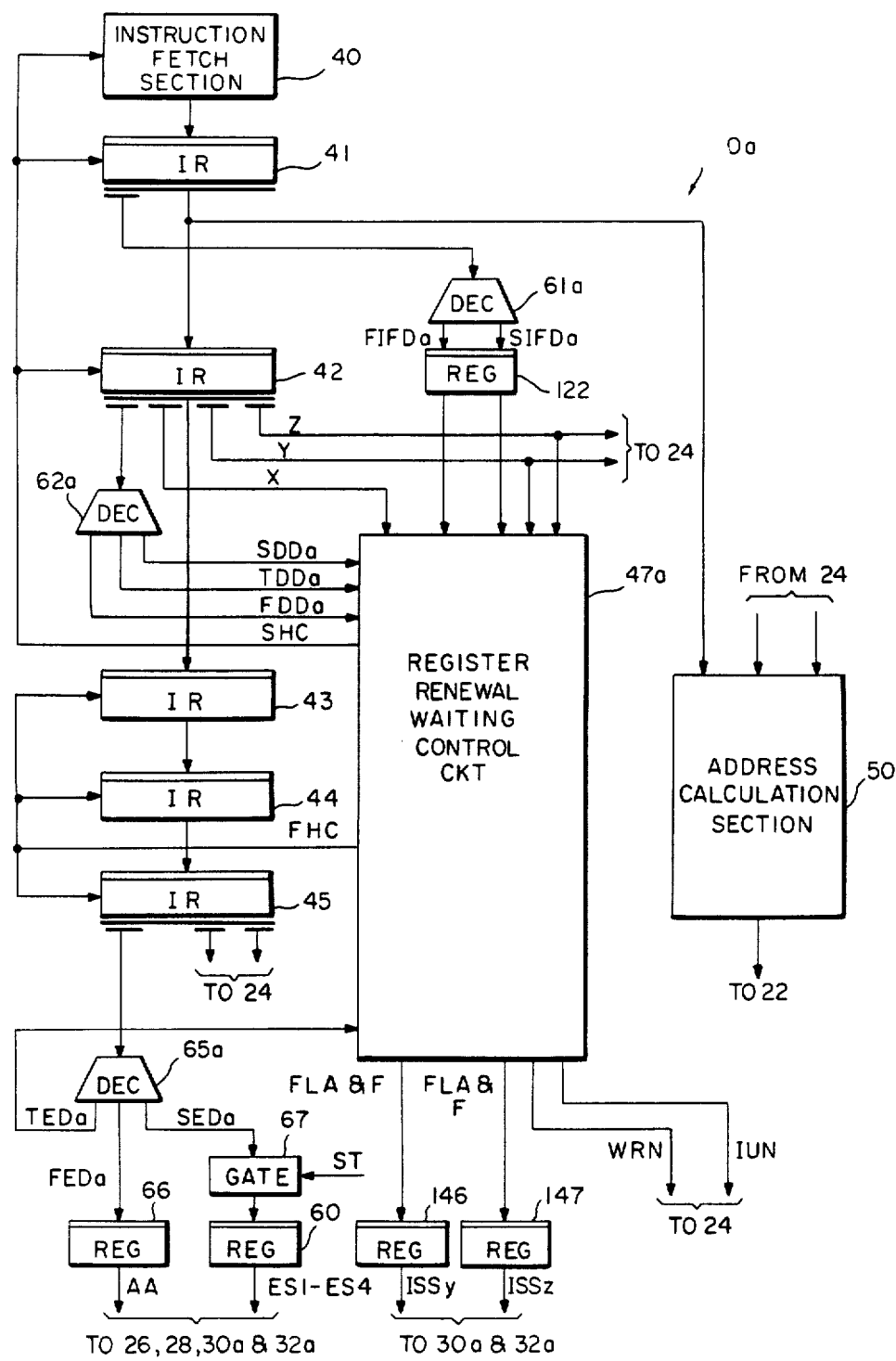
FIG. 9 is a block diagram of an instruction processing unit of the information processing system shown in FIG. 8.

Referring to FIG. 9, the instruction processing unit 20a is operable under five-stage pipeline control similar to the instruction processing unit 20 and includes similar circuit portions designated by like reference numerals as in FIG. 2.

In the IF stage, an IF stage instruction decoder 61a decodes the operation code OP of the program instruction set in the IF stage instruction register 41 as an IF stage instruction and produces first and second IF stage decoded signals FIFDa and SIFDa. The IF stage instruction decoder 61a produces an identification information signal as the first IF stage decoded signal FIFDa. The identification information signal is 3 bits long and identifies the arithmetic unit indicated by the IF stage instruction. The IF stage instruction decoder 61a produces the machine cycle number of the execution time of the IF stage instruction as the second IF stage decoded signal SIFDa. The first and the second IF stage decoded signals FIFDa and SIFDa are delivered to a register renewal waiting control circuit 47a via a D stage register 122.

In the D stage, a D stage instruction decoder 62a decodes the operation code OP of the program instruction set in the D stage instruction register 42 as a D stage instruction and produces first, second, and third D stage decoded signals FDDa, SDDa, and TDDa. The first D stage decoded signal FDDa is similar to the first D stage decoded signal FDD in the first embodiment. The D stage instruction decoder 62a produces the logical "1" level as the second D stage decoded signal SDDa when the D stage instruction is one of the load instructions and the store instructions. The D stage instruction decoder 62a produces the logical "1" level as the third D stage decoded signal TDDa when the D stage instruction is one of the operation instructions.

In the E stage, an E stage instruction decoder 65a decodes the operation code OP of the program instruction set in the E stage instruction register 45 as an E stage instruction and produces first, second, and third E stage decoded signals FEDa, SEDa, and TEDa. The second E stage decoded signal SEDa is four bits in length. When the E stage instruction is one of the operation instructions, the first E stage decoded signal FEDa is delivered to the arithmetic units 26, 28, 30a, and 32a as the arithmetic appointment signal AA via the register 66, and the four bit second E stage decoded signal SEDa has the logical "1" level at a bit corresponding to the arithmetic unit executing the operation instruction. The second E stage decoded signal SEDa is set in the register 60 via the gate 67. The gate 67 is controlled by a start signal ST which will be later described in connection with FIG. 11. The four bits set in the register 60 become the execution start signals ES1 through ES4. The E stage instruction decoder 65a produces the logical "1" level as the third E stage decoded signal TEDa when the E stage instruction is one of the operation instructions that is FADD instructions and MD instructions.

Figure 10:
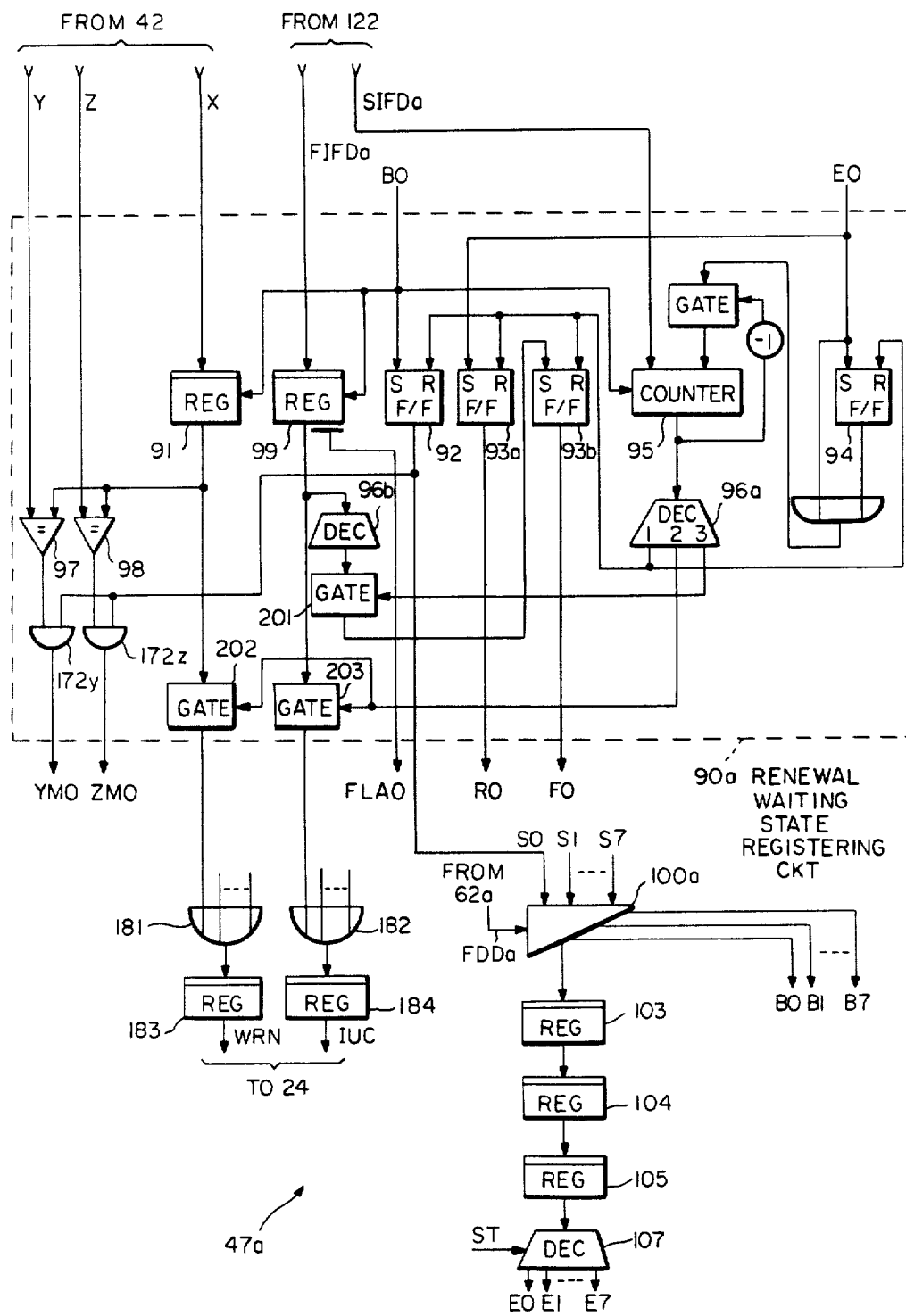
FIG. 10 is a block diagram of a portion of a register renewal waiting control circuit of the instruction processing unit shown in FIG. 9.
Figure 11:
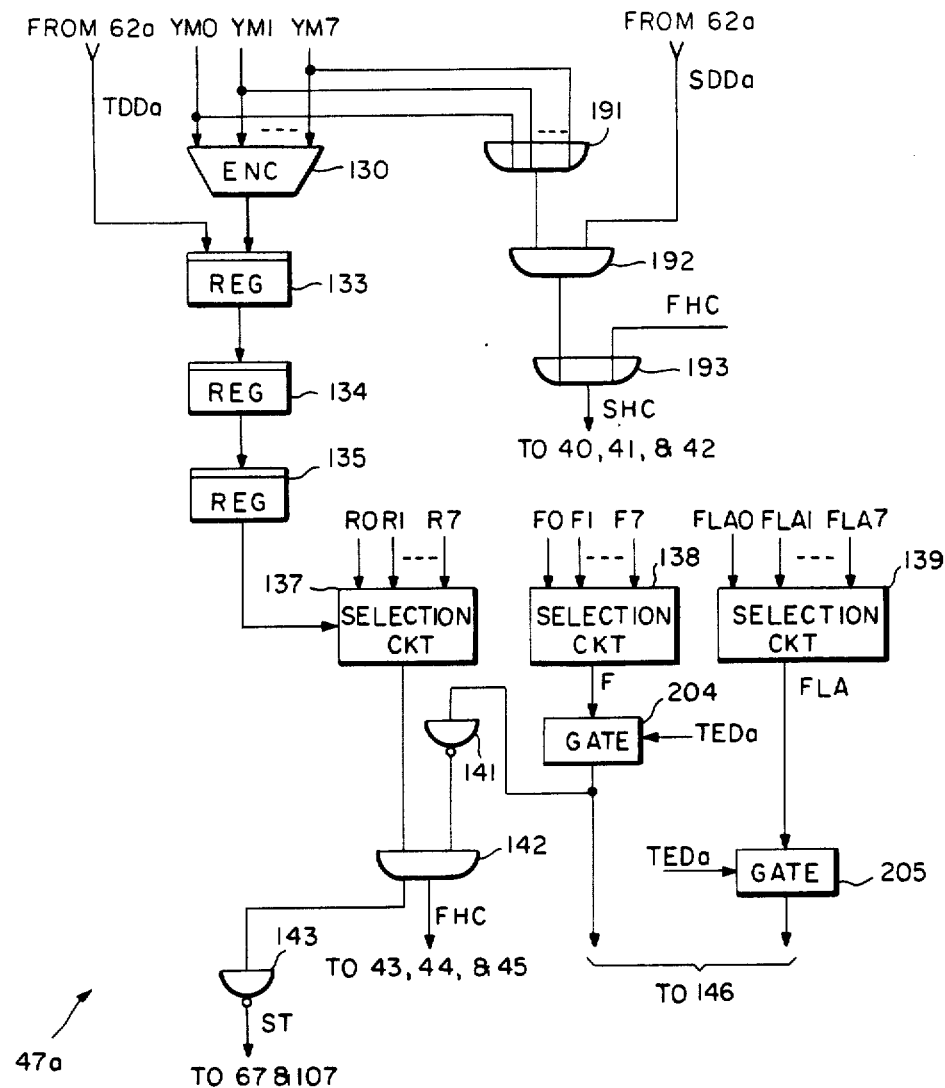
FIG. 11 is a block diagram of another portion of the register renewal waiting control circuit mentioned in conjunction with FIG. 9.

Referring to FIGS. 10 and 11, the register renewal waiting control circuit 47a includes similar circuit portions designated by like reference numerals as in FIGS. 4 and 5.

The renewal register detector of FIG. 10 is similar to the renewal register detector 70 of FIG. 5 and comprises eight renewal waiting state registering circuits assigned with entry numbers 0 through 7. One of the renewal waiting state registering circuits is shown in 90a. It will be assumed that the renewal waiting state registering circuit 90 is given the entry number 0. Seven other renewal waiting state registering circuits are operable like the renewal waiting state registering circuit 90a. The renewal waiting state registering circuit 90a comprises the renewal register number register 91, the flip-flops 92 and 94, the execution time counter 95, and the first and the second coincidence circuits 97 and 98 equivalent to those in the renewal waiting state registering circuit 90 shown in FIG. 5. An AND gate 172y and another AND gate 172z are similar to the AND gate 172 in FIG. 5. A first and a second coincidence signal YM0 and ZM0 is produced through the AND gates 172y and 172z, respectively, during a set condition of the flip-flop 92.

The renewal waiting state registering circuit 90a further comprises flip-flops 93a and 93b, decoders 96a and 96b, and an executing unit code register 99. The flip-flop 93a is used for setting a waiting index flag. The executing unit code register 99 is for storing the identification information signal FIFDa sent from the IF stage instruction decoder 61a via the D stage register 122 as will be described hereinafter. The decoder 96b decodes a content of the executing unit code register 99. The decoder 96b produces the logical "1" level as a decoded signal when the content of the executing unit code register 99 indicates either FADD unit 30a or MD unit 32a. The decoder 96a is for decoding decreasing numbers similar to the decoder 96 shown in FIG. 5. When the decreasing number of the counter 95 is "3", a decoded signal from the decoder 96a opens a gate circuit 201 to permit the decoded signal from the decoder 96b to set the flip-flop 93b. The flip-flops 92, 93a, 93b, and 94 is reset when the content of the counter 95 is "1".

A priority circuit 100a receives output signals S0 through S7 from flip-flops such as the flip-flop 92. When receiving the first D stage decoded signal FDDa from the D stage instruction decoder 62a, the priority circuit 100a selects one of the renewal waiting state registering circuits such as 90a and produces the selection signal of eight bits B0 through B7 in the similar manner as the selection circuit 100 in FIG. 5.

The selection signal is supplied to the renewal waiting state registering circuits such as 90a. When the renewal waiting state registering circuit 90a is selected at the priority circuit 100a, B0 bit of the selection signal is the logical "1" level which is applied to the renewal register number register 91, the flip-flop 92, the counter 95, and the executing unit code register 99. Thus, the renewal register number register 91, the counter 95, and the executing unit code register 99 store the data supplied thereto, respectively. Thus, a renewal condition of the renewal instruction set in the D stage instruction register 42 is registered into the renewal waiting state registering circuit 90a.

The priority circuit 100a further produces a first entry number signal in the similar manner as the encoder 101 in FIG. 5. Therefore, the priority circuit 100a corresponds to a circuit which combines the selection circuit 100 with the encoder 101 shown in FIG. 5.

Referring to FIG. 11, an encoder 130 encodes first coincidence signals YM0 through YM7 into an encoded signal of 3 bits length for indicating the entry number. The encoded signal will be referred to as a second entry number signal. The second entry number signal is set together with the third D stage decoded signal TDDa successively in the registers 133, 134, and 135 in A1, A2, and E stages, respectively. When the third D stage decoded signal TDDa is the logical "1" level, selection circuits 137, 138, and 139 responsive to content of the E stage register 135 check outputs R0 through R7 of the flip-flops, such as 93a, outputs F0 through F7 of the flip-flops, such as 93b, and the least significant bits FLA0 through FLA7 of the executing unit code registers, such as 99, so as to detect whether or not the operation instruction set in the E stage instruction register 45 should be executed.

Namely, when the third D stage decoded signal TDDa is the logical "1" level, the selection circuit 137 checks the output signal, such as R0, of the flip-flop, such as 93a, in the renewal waiting state registering circuit, such as 90a, indicated by the second entry number signal set in the E stage register 135. When the output signal R0 is the logical "1" level, the first holding control signal FHC is produced from an AND gate 142. Thus, the instruction registers 43, 44, and 45 are put into the suspended condition.

When the output signal R0 is the logical "0" level, the start signal ST is produced through the AND gate 142 and an inverter 143. So that the operation instruction set in the E stage instruction register 45 is executed.

With respect to selection circuits 138 and 139, detailed description will be later made.

FIG. 11 illustrates the circuit for processing the first coincidence signals YM0 through YM7, and not a circuit for processing the second coincidence signals ZM0 through ZM7 but which can be arranged similar to the circuit shown in FIG. 11.

In FIG. 11, a circuit comprising an OR gate 191, an AND gate 192, and an OR gate 193 is for generating the second holding control signal SHC to suspend the instruction fetch section 40, the IF stage instruction register 41 and the D stage instruction register 42.

When the second D stage decoded signal SDDa is the logical "1" level and when either one of the first coincidence signals YM0 through YM7 is the logical "1" level, the second holding control signal SHC is produced from the OR gate 193. The second holding control signal SHC is released when the flip-flop 92 is reset. When the first holding control signal FHC is produced from the AND gate 142, the second holding control signal SHC is also produced from the OR gate 193.

Referring again to FIGS. 9, 10, and 11, when the renewal instruction is set in the D stage instruction register 42 and when the renewal waiting state registering circuit 90a is selected, the register number of the GR number field X of the renewal instruction is set in the renewal register number register 91 and the machine cycle number for the D stage instruction is set in the execution time counter 95 as described above. At the same time, the flip-flop 92 is set and the identification information signal FIFDa is set in the executing unit code register 99.

When the renewal instruction is set in the E stage instruction register 45, the decoded signal of eight bits E0 through E7 is produced from the E stage decoder 107 (FIG. 10). Therefore, the flip-flops 93a and 94 are set by the E0 bit of the decoded signal. At the same time, the decrement of the counter 95 is started. When the content of the counter 95 is the decreasing number "1", the flip-flops 92, 93a, 93b, and 94 are reset by a decoded signal from the decoder 96a.

As described above, one of the renewal waiting state registering circuits is selected by the priority circuit 100a and the renewal condition is registered to the selected renewal waiting state registering circuit when the program instruction is one of the renewal instructions (the operation instructions and the load instructions). The renewal instruction will be called the registered instruction when the renewal condition of the renewal instruction is registered to the renewal waiting state registering circuit. The registered instruction is executed by the executing unit indicated thereby. When the result of execution is stored to one of the general registers of the register bank 24, namely, the renewal register, the renewal condition of the renewal waiting state registering circuit is released.

It will be now assumed that the renewal waiting state registering circuit 90a is selected by the priority circuit 100a and the registered instruction is the instruction which renews the renewal register of the register number i. At this time, the register number i is held in the renewal register number register 91 as a held number.

Now, a description will be made as to processing a program instruction fetched from the instruction fetch section 40 and preceded by the registered instruction. The program instruction will be referred to as a current instruction.

It will be assumed that the current instruction has the GR number field Y showing the register number i.

When the current instruction is set in the D stage instruction register 42, the coincidence of the register number of the GR number field Y of the current instruction with the held number is checked by the first coincidence circuit 97. Since the held number is i and the register number of the GR number field Y is also i, the first coincidence circuit 97 produces the first coincidence signal YMO of the logical "1" level.

When the current instruction set in the D stage instruction register 42 is one of the load instructions or the store instructions, the second D stage decoded signal SDDa is the logical "1" level so that the second holding control signal SHC is the logical "1" level, as described hereinbefore in connection with FIG. 11. Therefore, the IF and D stage instruction registers 41 and 42 and the instruction fetch section 40 are put into the suspended condition. The suspended condition is maintained until the content of the counter 95 becomes a decreasing number "1". When the content of the counter 95 decreases to zero, the current instruction is set in the A1 stage instruction register 43, because the second holding control signal SHC is stopped as described hereinbefore.

If the current instruction set in the D stage instruction register 42 is one of the operation instructions, the first coincidence signals YM0 through YM7 are encoded by the encoder 130 to the second entry signal indicating the entry number 0 which is set in the A1 stage register 133. At the same time, the third D stage decoded signal TDDa of logic "1" level is set into the A1 stage register 133 as an effective index bit.

As described above, when the second entry number signal is set in the E stage register 135, the selection circuit 137 performs the checking operation.

When the registered instruction is now being executed, the output signal R0 of the flip-flop 93a in the renewal waiting state registering circuit 90a of the entry number 0 is the logical "1" level. Accordingly, the first holding control signal FHC is produced from the AND gate 142.

When the execution of the registered instruction is completed, the flip-flop 93a is reset as described above so that the output signal R0 is the logical "0" level. Accordingly, the start signal ST is produced from the inverter 143 to the gate 67 and then, the current instruction is executed, because the execution start signal ES1 through ES4 are issued as described above.

Each arithmetic unit is operable under a multiple stage pipeline control. The multiple stages comprise a first stage for receiving the operands and a final stage for holding the result of execution. The arithmetic unit comprises a result holding register (not shown) for holding the result of execution. The register bank 24 includes a write-in register (not shown) for writing the result of execution and others into the general register.

The result of execution is delivered from the result holding register to the write-in register and is stored in one of the general registers of the register bank 24. Processing for delivering the result of execution from the result holding register of the arithmetic unit to the write-in register of the register bank 24 requires one machine cycle. Processing for storing the result of execution from the write-in register of the register bank 24 to one of the general registers of the register bank 24 also requires one machine cycle. As a result, it takes two machine cycles for storing the result of the execution into the general register from the arithmetic unit.

If the result of execution is equal to data required for executing a successive instruction, the result of execution can be read from the result holding register and used for executing the successive instruction before the result of execution is stored in the general register. In comparison with a usual manner to obtain the same data from the general register of the register bank 24, the execution of the next successive instruction can be started earlier.

In order to enable to use a result of execution of the registered instruction which is an FADD instruction or an MD instruction for executing the current instruction which is an FADD instruction or an MD instruction before the result of execution is stored in the general register, the system according to the second embodiment of FIGS. 8-11 further comprises the selection circuits 138 and 139 (FIG. 11), and an input selection index register 146 (FIG. 9).

The selection circuit 138 receives outputs F0 through F7 of flip-flops such as 93b of all of the renewal waiting state registering circuits and produces an F bit signal as will be described hereinafter.

The selection circuit 139 receives unit indication signals FLA0 through FLA7 supplied from all of the renewal waiting state registering circuits. Each of the unit indication signals FLA0 through FLA7 is a signal representing the least significant bit of the content set in the executing unit code register in each renewal waiting state registering circuit.

The unit indication signal is the logical "1" level when the registered instruction is the FADD instruction, but is the logical "0" level when it is the MD instruction.

The selection circuit 139 produces an FLA bit signal as will be described hereinafter.

When the gate circuits 204 and 205 are actuated by the third E stage decoded signal of the logical "1" level, the input selection index register 146 receives the F bit signal and the FLA bit signal and produces an input selection signal ISSy. The FADD unit 30a and the MD unit 32a receive the input selection signal ISSy as the signal ISS from the instruction processing unit as described hereinbefore.

When the second entry number signal is set in the E stage register 135 as described above, the selection circuits 138 and 139 operate in the following manner.

The selection circuit 138 selects that one of the outputs F0 through F7 which is corresponding to the second entry number signal set in the register 135 and produces the selected one as the F bit signal. The selection circuit 139 likewise selects that one of the unit indication signals FLA0 through FLA7 which is corresponding to the same second entry number signal and produces the selected one as the FLA bit signal.

It is now assumed that the entry number is zero and that the registered instruction is being executed with the content of the counter 95 being the decreasing number "3". Then, the flip-flop 93b is set by the output of the decoder 96b. Therefore, the F bit signal is F0 signal of the logical "1" level, and the R0 signal is the logical "1" level.

Since the registered and current instructions are FADD or MD instructions, the third E stage decoded signal TEDa is the logical "1" level, as described hereinabove. Therefore, the F bit signal of the logical "1" level is applied to the AND gate 142 as the logical "0" level signal through an inverter 141. As a result, the start signal ST is the logical "1" level with the first holding control signal FHC being the logical "0" level although the R0 signal of the logical "1" level is applied to the AND gate 142 from the selection circuit 137. Accordingly, the current instruction set in the E stage instruction register 45 is delivered to the arithmetic unit, that is, the FADD unit 30a or the MD unit 32a indicated by the current instruction.

On the other hand, the F bit signal of the logical "1" level and the FLA bit signal are set in the input selection index register 146, which produces the input selection signal ISSy of two bit length to the FADD unit 30a and the MD unit 32a. The first bit is corresponding to the F bit signal and the second bit is corresponding to the FLA bit signal of the logical "0" level or the logical "1" level.

It is further assumed that the registered instruction is the MD instruction and that the current instruction is the FADD instruction. Then, the FLA bit signal is the logical "0" level.

The registered instruction is executed in the MD unit 32a and the result of execution is held in the result holding register (not shown) of the MD unit 32a. This is indicated by the input selection signal ISSy which comprises the first bit of the logical "1" level and the second bit of the logical "0" level. The input selection signal ISSy is represented by a binary code (10).

According to the input selection signal ISSy, the FADD unit 30a selects that one of the input ports 303 which is connected to the output port 322 of the MD unit 32a and takes in the result of execution held in the result holding register in the MD unit 32a. Thus, the FADD unit 30a executes the current instruction.

If the registered instruction is the FADD instruction, the FLA bit signal is the logical "1" level. Then, the FADD unit 30a selects another input port connected to the output port 302 of the FADD unit 30a and takes in the result of execution of the registered instruction from the output port 302.

If the current instruction is the MD instruction, the MD unit 32a selects one of the input port 323 connected to the output port 302 of the FADD unit 30a or the output port 322 of the MD unit 32a depending on whether the second bit of the input selection signal ISSy is the logical "1" level or the logical "0" level. Then, the MD unit 32a executes the current instruction.

For the second coincidence signals ZM0 through ZM7 with respect to the register numbers shown in the GR number fields Z of the current instructions, another input selection index register 147 is shown in FIG. 9, and another selection circuit (not shown) similar to the selection circuit 137 is also provided.

Figure 12:
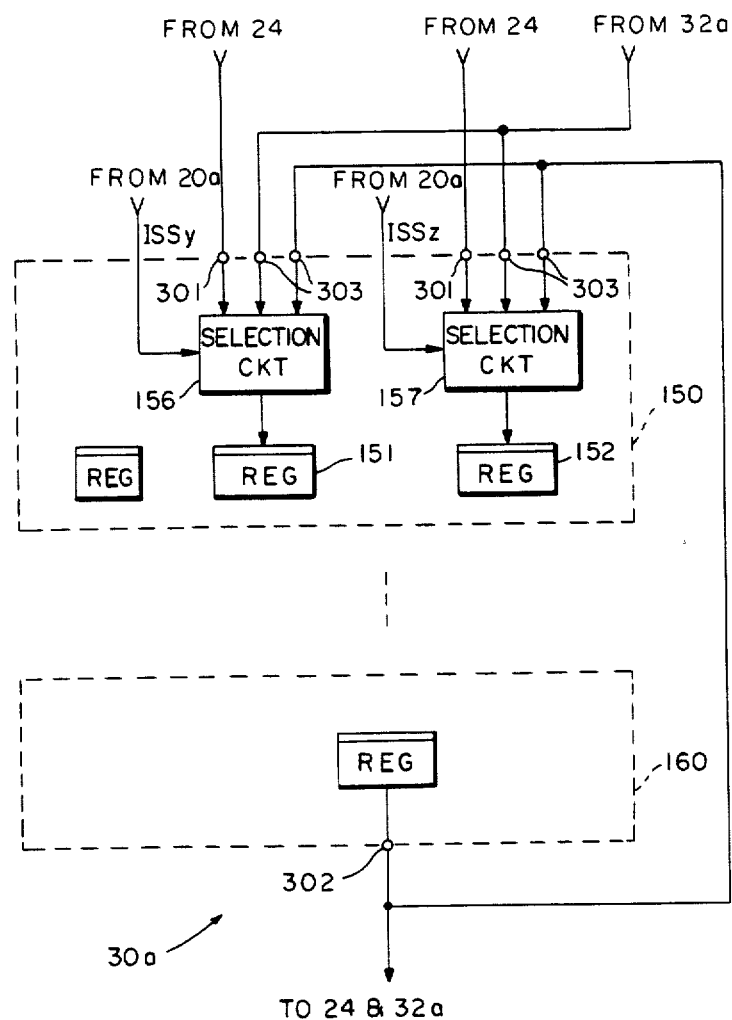
FIG. 12 is a block diagram of an FADD (floating-point add-subtract) unit of the information processing system shown in FIG. 8.

Referring to FIG. 12, the FADD unit 30a is operable under four-stage pipeline control. The four stages of the pipeline control include a first stage portion 150 and a final stage portion 160.

The first stage portion 150 comprises a first operand register 151 and a second operand register 152. The first stage portion 150 further comprises a first operand selection circuit 156 and a second operand selection circuit 157. The first operand selection circuit 156 responsive to the input selection signal ISSy selects one of three input signals as a first operand. The three input signals are the signal read from the register bank 24, the output signal of the FADD unit 30a, and the output signal of the MD unit 32a. The first operand should be set in the first operand register 151. The second operand selection circuit 157 responsive to the input selection signal ISSz similarly selects one of three input signals as the second operand. The three input signals are the signal read from the register bank 24, the output signal of the FADD unit 30a, and the output signal of the MD unit 32a. The second operand should be set in the second operand register 152.

More specifically, the first selection circuit 156 sets the signal read out from the register bank 24 in the first operand register 151 when the input selection signal ISSy is represented by a binary code (00) or (01). The first selection circuit 156 sets the output signal of the MD unit 32a in the first operand register 151 when the input selection ISSy is represented by a binary code (10). The first selection circuit 156 sets the output signal of the FADD unit 30a in the first operand register 151 when the input selection signal ISSy is represented by a binary code (11). The second selection circuit 157 is operable like the first selection circuit 156.

The MD unit 32a comprises an input selector similar to the input selector of the FADD unit 30a shown in FIG. 12.

As described hereinbefore, the instruction processing unit 20 gives the register bank 24 the write-in indication signal, the register number signal, and the selection indication signal.

In the information processing system according to the second embodiment, the register number signal and the selection indication signal can be produced from the renewal waiting state registering circuits 90a.

Reviewing FIG. 10, when the content of the execution time counter 95 is the decreasing number "2", the decoder 96a produces an actuating signal to actuate gate circuits 202 and 203. Accordingly, the held number held in the renewal register number register 91 is delivered to an OR gate 181 and supplied to a write-in register number register 183. The content of the executing unit code register 99 is delivered through the gate circuit 203 to another OR gate 182 and supplied to an input unit selection code register 184.

The write-in register number register 183 produces a write-in register number signal WRN to the register bank 24 as the register number signal. The input unit selection code register 184 produces an input unit code signal IUC to the register bank 24 as the selection indication signal. Thus, the result of execution of the registered instruction can be written into the general register indicated by the registered instruction. The output signals from the renewal register number register such as 91 and the executing unit code register such as 99 in each of the other renewal waiting state registering circuits are also delivered to OR gates 181 and 182, respectively.

While detailed description is omitted, it is controlled that the contents of the execution time counters, such as 95, are simultaneously not the decreasing number "2". For example, when two operation instructions are under execution and when the contents of the execution time counters for the two operation instructions are now the decreasing numbers "7" and "8", respectively, execution start of another operation instruction set in the E stage instruction register is delayed by two machine cycles if the execution time of the another operation instruction is seven machine cycles. Thus, it is possible to prevent the results of execution of different operation instructions from contention for the write-in data input port of the register bank 24.

What is claimed is:

1. In an information processing system comprising a bank of general registers assigned with register numbers, respectively, an instruction processing unit for processing, as a current instruction, each of program instructions fetched successively from a memory device to produce a start signal and for reading an operand from a general register of one of said register numbers that is indicated by said current instruction, and an executing unit indicated by said current instruction and responsive to said start signal for executing said current instruction in an execution time next succeeding said start signal, said program instructions including renewal instructions for renewing the general registers of the register numbers indicated by the renewal instructions, said instruction processing unit including processing means for processing said current instruction to produce said start signal, an improvement wherein said instruction processing unit comprises:

holding means for holding, as a held number, a register number indicated by one of said renewal instructions that is processed by said processing means as a current renewal instruction;

decoding means for decoding said current renewal instruction to produce, as a machine cycle number, a number for machine cycles of which consists the execution time of the executing unit for said current renewal instruction;

reducing means responsive to the start signal produced for said current renewal instruction for reducing one from said machine cycle number in each machine cycle after reception of the start signal to successively provide decreasing numbers;

coincidence finding means for finding coincidence between said held number and each of the register numbers indicated by the program instructions which should successively be processed by said processing means as successive instructions following said current renewal instruction, said coincidence finding means producing a coincidence signal whenever said coincidence is found;

suspending means responsive to said coincidence signal for suspending said processing means for said successive instructions; and reading means responsive to said decreasing numbers for reading the operands from general registers of the register numbers indicated by said successive instructions.

2. In an information processing system comprising a bank of general registers assigned with register numbers, respectively, an instruction processing unit for processing, as a current instruction, each of program instructions fetched successively from a memory device to produce a start signal and for reading an operand from a general register of one of said register numbers that is indicated by said current instruction, and an executing unit indicated by said current instruction and responsive to said start signal for executing said current instruction in an execution time next succeeding said start signal, said program instructions including renewal instructions for renewing the general registers of the register numbers indicated by the renewal instructions, said instruction processing unit including processing means for processing said current instruction to produce said start signal, an improvement wherein said instruction processing unit comprises:

holding means for holding, as a held number, a register number indicated by one of said renewal instructions that is processed by said processing means as a current renewal instruction;

decoding means for decoding said current renewal instruction to produce, as a machine cycle number, a number for machine cycles of which consists the execution time of the executing unit for said current renewal instruction;

reducing means responsive to the start signal produced for said current renewal instruction for reducing one from said machine cycle number in each machine cycle after reception of the start signal to successively provide decreasing numbers;

signal producing means responsive to said decreasing numbers for producing a releasing signal when one of the decreasing numbers is a predetermined number;

coincidence finding means for finding coincidence between said held number and each of the register numbers indicated by the program instructions which should successively be processed by said processing means as successive instructions following said current renewal instruction, said coincidence finding means producing a coincidence signal whenever said coincidence is found;

suspending means responsive to said coincidence signal for suspending said processing means for said successive instructions; and releasing means responsive to said releasing signal for releasing said suspending means to restart the suspended processing means.

3. An information processing system as claimed in claim 2 and comprising a plurality of executing devices, each having an input port and an output port, said executing unit being one of said executing devices that is indicated by said current instruction, said renewal instructions including operation instruction, one of said executing devices that is indicated by each operation instruction producing a result of execution from said output port, wherein a particular one of said executing devices having an additional input port connected to the output port of said particular one of the executing devices.

4. An information processing system as claimed in claim 2 and comprising a plurality of executing devices, each having an input port and an output port, said executing unit being one of said executing devices that is indicated by said current instruction, said renewal instructions including operation instructions, one of said executing devices that is indicated by each operation instruction producing a result of execution from said output port, wherein each of a first and a second particular one of said executing devices having a first and a second additional input port, the first and the second additional input port of said first particular one of the executing devices being connected to the output port of said first and said second particular ones of the executing devices, respectively.

5. An information processing system as claimed in claim 3, wherein:

said instruction processing unit further comprises means for generating a selection signal indicating to select said additional input port, said selection signal being supplied to said particular one of the executing devices together with said start signal;

said particular one of the executing devices comprising:

selecting means responsive to the selection signal for selecting said additional input port.

6. An information processing system as claimed in claim 4, wherein:

said executing unit is said second particular one of the executing devices;

said instruction processing unit further comprises means for generating a selection signal indicating to select said second additional input port, said selection signal being supplied to said first particular one of the executing devices together with said start signal;

said first particular one of the executing devices comprising:

selecting means responsive to said selection signal for selecting said second additional input port.

* * * * *